US008000452B2

(12) United States Patent
Watkins et al.

(10) Patent No.: US 8,000,452 B2
(45) Date of Patent: Aug. 16, 2011

(54) METHOD AND SYSTEM FOR PREDICTIVE INTERACTIVE VOICE RECOGNITION

(75) Inventors: Gary A. Watkins, Royal Oak, MI (US); James M. Smith, Utica, MI (US)

(73) Assignee: General Motors LLC, Detroit, MI (US)

( * ) Notice: Subject to any disclaimer, the term of this patent is extended or adjusted under 35 U.S.C. 154(b) by 907 days.

(21) Appl. No.: 10/898,857

(22) Filed: Jul. 26, 2004

(65) Prior Publication Data
US 2006/0018440 A1    Jan. 26, 2006

(51) Int. Cl.
*H04M 1/64* (2006.01)
(52) U.S. Cl. ............... 379/88.02; 379/88.03; 379/88.23; 704/246; 704/247; 704/251; 704/252

(58) Field of Classification Search .... 379/88.01–88.03, 379/88.23; 704/257, 273, 254, 246, 247, 704/251, 252, E15.001; 340/905
See application file for complete search history.

(56) References Cited

U.S. PATENT DOCUMENTS

| 5,774,525 | A  | * | 6/1998 | Kanevsky et al. | 379/88.02 |
| 6,016,336 | A  | * | 1/2000 | Hanson | 379/88.23 |
| 7,038,596 | B2 | * | 5/2006 | Nakajima | 340/905 |

* cited by examiner

*Primary Examiner* — Md S Elahee
(74) *Attorney, Agent, or Firm* — Anthony Luke Simon; Reising Ethington P.C.

(57) ABSTRACT

A method for a predictive interactive voice recognition system includes receiving a voice call, associating said voice call with a behavioral pattern, and invoking a service context responsive to said behavioral pattern. The system provides advantages of improved voice recognition and more efficient use of the voice user interface to obtain services.

7 Claims, 5 Drawing Sheets

100

400

500

US 8,000,452 B2

METHOD AND SYSTEM FOR PREDICTIVE INTERACTIVE VOICE RECOGNITION

TECHNICAL FIELD

This invention relates to a method and system for predictive interactive voice recognition.

BACKGROUND OF THE INVENTION

Interactive Voice Recognition (IVR) systems act as a bridge between computer databases and the people that access them. IVR systems are popular and cost effective, providing a self-service customer interface for businesses with little direct labor costs. IVR systems have evolved over time, providing improvements such as touch-tone replacement where the system may, for example, prompt "for information press or say one". These systems replace touch tone interfaces with speech recognition applications that recognize a set of spoken numbers and letters that appear on a touch tone keypad.

Some improved IVR systems provide directed dialogs where the system may, for example, prompt "would you like ticket pricing or availability?" and the caller responds with "availability". Typically, directed dialog systems are designed to recognize a small set of keywords spoken by a caller. Further improvements to existing IVR systems include natural language processing, where the system may, for example, prompt "what transaction would you like to perform?" and the caller responds with "transfer 200 dollars from savings to checking".

SUMMARY OF THE INVENTION

Advantageously, this invention provides a method for predictive interactive voice recognition according to claim 1.

Advantageously, according to one example, this invention provides a method for predictive interactive voice recognition that receives a voice call, associates a voice call with a behavioral pattern, and invokes a service context responsive to a behavioral pattern.

Advantageously, according to a preferred example, the method records caller service requests, creates a plurality of data records responsive to the caller service requests, categorizes caller service requests responsive to a plurality of service contexts, and records a behavioral pattern in response to the categorization. Benefits include taking advantage of known information to identify a presumed purpose of a call without requiring the caller to expressly identify the purpose every time. The system can then provide more efficient service by allowing the direct placement into a service context, eliminating requirement of high level menus, while allowing for improved accuracy.

DESCRIPTION OF AN EXEMPLARY EMBODIMENT

Figure 1:
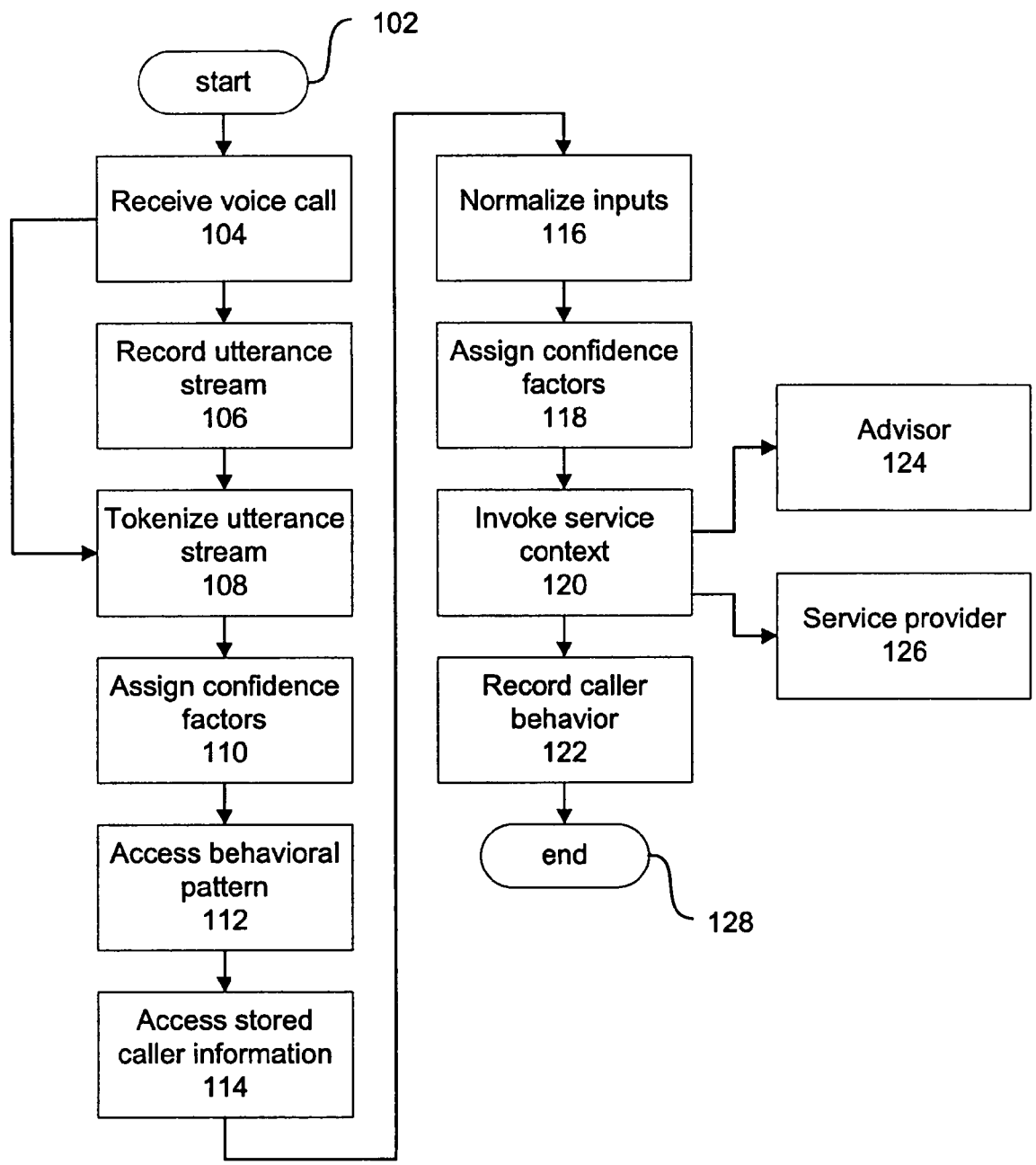
FIG. 1 illustrates example method steps for implementing this invention.
Figure 2:
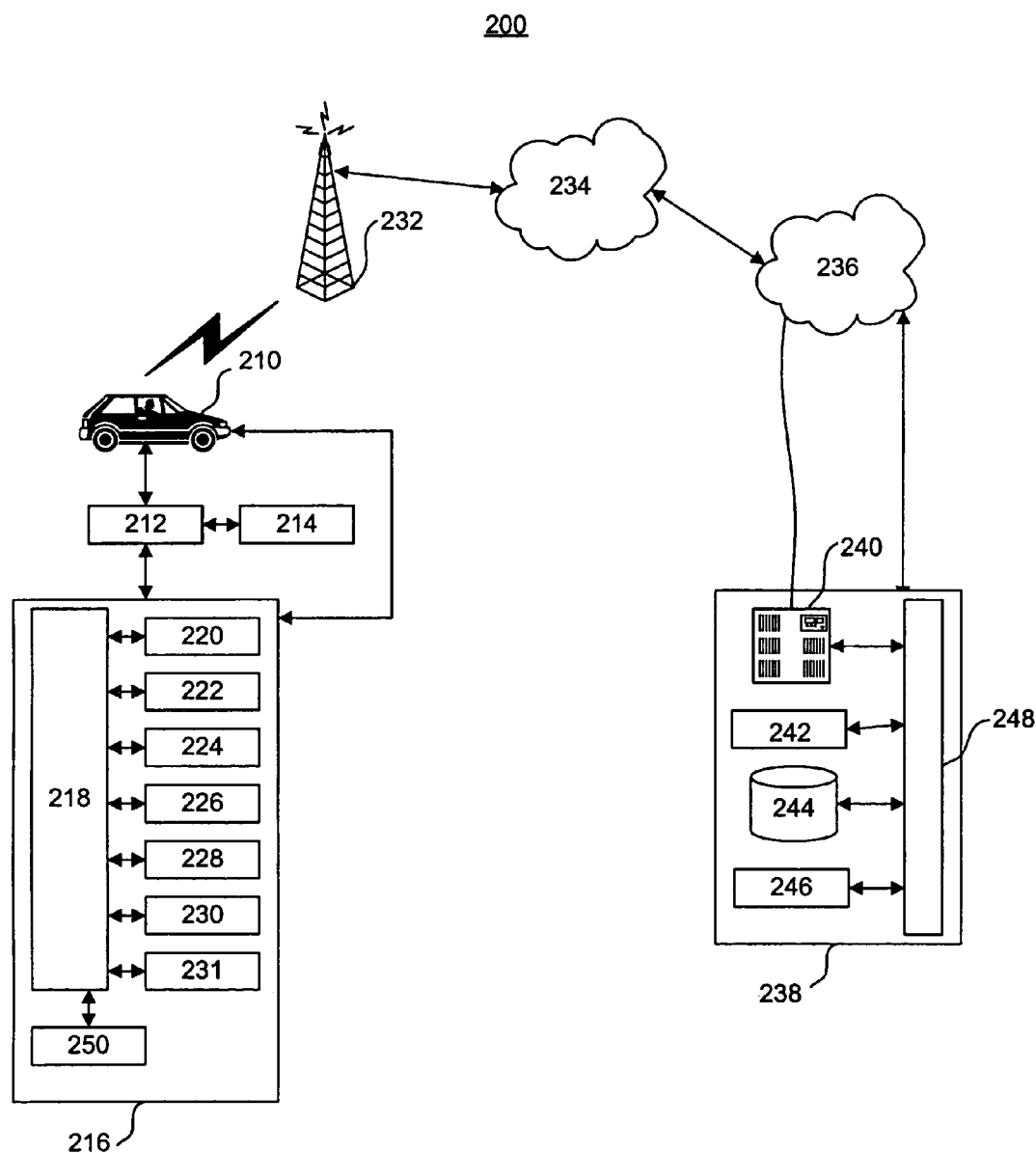
FIG. 2 illustrates an example system for implementing the method steps of FIG. 1.

Referring to FIGS. 1 and 2, example method steps for interactive voice recognition 100 begin at 102. An IVR receives a voice call 104, in which (a) the caller immediately speaks to the IVR without waiting for a greeting, prompt, or menu, or (b) the caller waits for a greeting, prompt, or menu from the IVR.

The IVR records the incoming caller utterance stream 106 and retains the utterances in a buffer for tokenization 108. The utterance stream may be recorded 106 in a memory (FIG. 2, 224) associated with a telematics unit (FIG. 2, 216). Alternatively, caller utterances are tokenized 108 as they are received. Tokenization comprises separating the caller's utterances into discrete entities or symbols representing individual words. The tokenization process comprises receiving an analog acoustic signal (the caller utterances), converting the acoustic signal to a quantized digital signal, and constructing overlapping frames representing the digital signals. Tokenization, including quantization and frame construction, are well known in the art.

In one embodiment, words uttered by the caller are separated by the caller, with the caller intentionally pausing between words. This method is known as isolated word recognition, wherein the IVR requires a period of quiescence between utterances. In another embodiment the words spoken by the caller may be continuous. This method is known as continuous speech recognition. Both isolated word recognition and continuous speech recognition are well known in the art.

The tokens are assigned a confidence factor 110, with the confidence factor predicting the degree of belief that the tokens are associated with or represent particular words. For example, confidence factors represented as probabilities may be assigned via Bayes' Theorem, where the probability P of a word is based on in incoming signal or token, such that $$P(word|signal)=P(word)P(signal|word)/P(signal).$$

Bayes' Theorem is well known in the art.

The identification of the caller, if known, is used to access previous caller behavior 112. In one embodiment the caller may be, for example, a telematics service subscriber. For example, the telematics service subscriber may repeatedly ask for navigation instruction, being a real estate agent visiting new addresses daily and relying heavily on navigation routing instructions. In another example, the telematics service subscriber may be a traveling salesperson frequently requesting access to phone mail and email within a mobile vehicle in addition to navigation routing instructions.

In another example, the information contained in the caller behavioral pattern may be the aggregate of the behavior of many callers requesting services or responding to events or notifications issued by a service provider. For example, if the caller is a telematics service subscriber, and the telematics service provider issues a subscription renewal notification, then the average caller response time to the renewal notification comprises an aggregate behavior pattern.

The information contained in the caller behavioral pattern is used to determine a confidence factor to be compared with a confidence factor determined for the caller utterance. In one embodiment, a confidence factor may be determined by Bayes' Theorem, where the probability P of a caller preference is based on previous behavior, such that $$P(pref|behavior)=P(behavior)P(pref|behavior)/P(pref).$$

In this embodiment, the confidence factor, represented as a probability, is stored in a memory (FIG. 2, 224) associated with a telematics unit (FIG. 2, 216).

In another example, the caller's previous behavior is based on how frequently the caller has used a particular service or set of services.

In yet another example, the caller utterance may not be present, or if present, yields no definitive confidence factor, and only the confidence factor for the behavioral preference is utilized to invoke a service, such as, for example, a navigation routing request.

In method step 114, the caller identification information such as, for example, vehicle identification number (VIN) or personal identification number (PIN), is used to access stored caller information. The telematics service provider may offer various subscription packages containing different service options, such as, for example, navigation and concierge services in one package, and basic emergency services in another. Stored caller information comprises caller identification information and the class of services a subscriber is entitled to. For example, if a caller is a telematics service subscriber, and the caller subscribes to a basic package that does not provide concierge services, caller identification information may preclude use of the concierge services.

Figure 3:
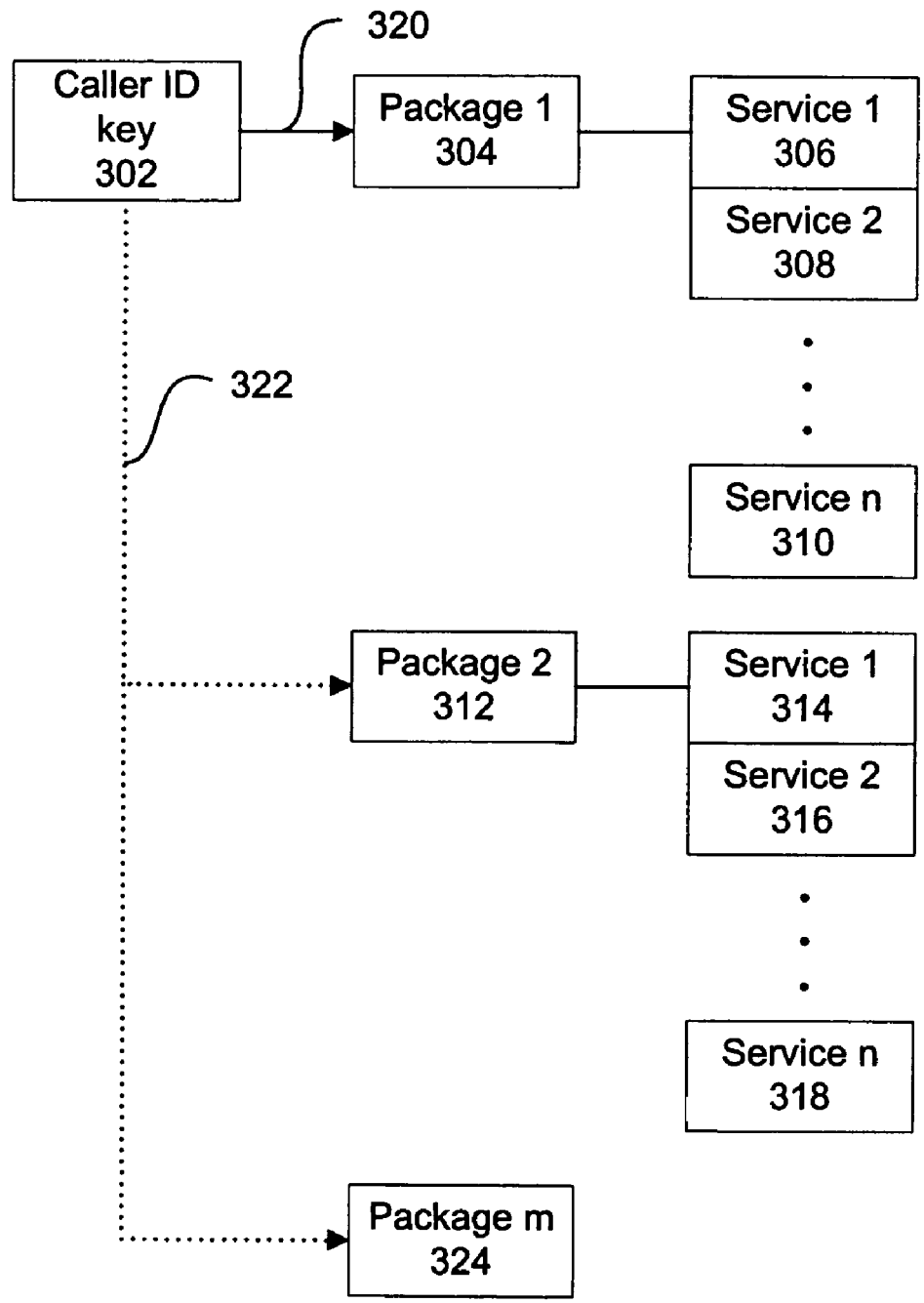
FIG. 3 is an example caller information data structure.

Referring now also to FIG. 3, information within the caller identification database (FIG. 2, 244) is structured such that the identification of the caller is used to index into a data structure representing the services the caller subscribes to (FIG. 3, 300).

The confidence factors assigned to the utterance tokens 110, the caller behavior pattern 112, along with the structured stored caller information 114 are normalized in step 116. The step of normalization comprises transforming the input data to a common format or representation, such as, for example, transforming numerical and textural data to a common textural format. The common textural format may be, for example, represented in ASCII (American Standard Code for Information Interchange). In another embodiment the data may be represented symbolically, where the records from the caller behavior pattern are represented as variables. For example, a data record variable may be established for a pattern of navigation request calls. This variable may be assigned the name NAV_CALLS, where the actual number of calls may be substituted in other method steps. In yet another embodiment, the data may be represented numerically.

Preferably, a non-existent caller utterance resulting in the absence of caller utterance data is ignored in any normalization process or calculation.

Referring now to step 118 the confidence factors determined for the caller's previous behavior and the uttered token or token stream are compared. For example, the confidence factor for a navigation routing request may be high and the confidence factor for an uttered token representing a navigation request may be high. The similarly high confidence factors indicate that a navigation request was made.

If the caller utterance token is not present, there is no confidence factor comparison and the confidence factor used for the caller behavioral pattern is singularly utilized. In another embodiment, a confidence factor for the aggregate user behavior is utilized. In another embodiment, a confidence factor for individual user behavior is utilized.

Also a composite confidence factor may be generated as a result of utilizing the confidence factor for the uttered token and the confidence factor for the behavioral pattern as arguments in Bayes' formula. In another example, if the utterance confidence factor for the selected service is too low, the presumption can be made that the user desires another service, in which case the system exits the current service context to a higher level menu, another context or an operator.

Referring to step 120, the compared confidence factors are used to invoke a service context. A service context is the presumed service that the caller desires as indicated by the confidence factors. For example, if the confidence factors exceed a threshold indicating that the call is a navigation request, the caller is placed into a navigation service voice interface. This voice interface is tailored according to one skilled in the art with voice menu options for navigation service commands. By narrowing the voice menu selections primarily to navigation commands when navigation commands are expected, it is possible to improve the accuracy of voice recognition (both discrete and continuous speech) due to the statistical advantages by having a reduced menu set. Of course, the navigation context is only one example, and the number and types of service contexts are limited only by the designer's choice of desired services.

In the even that the confidence factors do not create a strong indication of a particular service context, then the user is entered into a general service context designed to identify the desired service through voice user interface interactions. In each service context, the user is provided menu options to exit the particular context or move to another context. This accounts for inadvertent placement into the wrong context and users who desire multiple services.

In another example, an advisor 124 may be invoked if a confidence factor for a particular domain is not adequately determined. The advisor may be human or an automaton or virtual advisor. Live advisor interactions may be included in any given service context as desired by the system designer.

Method step 122 records the most recent caller behavior in the behavioral pattern database. The behavioral pattern database may reside at a call center (FIG. 3, 238) within a subscriber information database (FIG. 3, 244). The behavioral pattern 122 is updated by categorizing the caller service requests into specific contexts, such as navigation, vehicle service, point of interest inquiry, information service request, etc. and then stored with relevant parameters. The updated behavioral pattern is then available to method step 112. A database is maintained for individual caller behavior patterns, aggregate caller behavior patterns, or both individual and aggregate caller behavior. The method steps end at 128.

In FIG. 2, the system 200 includes a vehicle 210, a vehicle communications network 212, a telematics unit 216, one or more wireless carrier systems 232, one or more communication networks 234, one or more land networks 236, and one or more call centers 238. In one embodiment, vehicle 210 is implemented as a mobile vehicle with suitable hardware and software for transmitting and receiving voice and data communications. System 200 may include additional components not relevant to the present discussion but well known in the telematics arts. Mobile vehicle communication systems are known in the art.

Vehicle 210, via vehicle communication network 212, sends signals from the telematics unit 216 to various units of equipment and systems 214 within the vehicle 210 to perform various functions such as unlocking a door and executing personal comfort settings. In facilitating interaction among the various communications and electronic modules, vehicle communications network 212 utilizes interfaces such as controller area network (CAN), ISO standard 11989 for high speed applications, ISO standard 11519 for lower speed applications, and Society of Automotive Engineers (SAE) standard J1850 for high speed and lower speed applications. Vehicle communications network 212 is also referred to as a vehicle bus.

Vehicle 210, via telematics unit 216, sends and receives radio transmissions from wireless carrier system 232. Wireless carrier system 232 is implemented as a cellular telephone system or any other suitable system for transmitting signals between vehicle 210 and communications network 234.

Telematics unit 216 includes a processor 218 coupled to a wireless modem 220, a global positioning system (GPS) unit 222, an in-vehicle memory 224, a microphone 226, one or more speakers 228, and an embedded or in-vehicle mobile phone 230. For example, referring to FIGS. 1 and 2, a caller may initiate a call to an IVR via microphone 226 coupled to the in-vehicle or mobile phone 230 associated with the telematics unit 216. Caller utterances into the microphone 226 are received (FIG. 1, 104) at a call center 238, which tokenizes the utterance stream (FIG. 1, 106) for further processing. In one embodiment, the tokenized utterances are placed in a subscriber information database 244 at the call center 238. The IVR may be hosted at the call center or at a remote location.

In other example, telematics unit 216 may be implemented without one or more of the above listed components, such as, for example, speakers 228. It is understood that the speaker 228 may be implemented as part of the vehicle audio system, which accepts audio and other signals from telematics unit 216 as is known in the art. Telematics unit 216 may include additional components and functionality as determined by the system designer and known in the art for use in telematics units.

Processor 218 may be implemented as a micro controller, controller, microprocessor, host processor, or vehicle communications processor. In another embodiment, processor 218 is implemented as an application specific integrated circuit (ASIC). Alternatively, processor 218 is implemented as a processor working in conjunction with a central processing unit (CPU) performing the function of a general-purpose processor.

GPS unit 222 provides latitude and longitude coordinates of the vehicle 110 responsive to a GPS broadcast signal received from one or more GPS satellites (not shown). In-vehicle mobile phone 230 is a cellular type phone, such as, for example an analog, digital, dual-mode, dual-band, multi-mode or multi-band cellular phone.

Associated with processor 218 is a real time clock (RTC) 231 providing accurate date and time information to the telematics unit hardware and software components that may require date and time information. In one embodiment date and time information may be requested from the RTC 231 by other telematics unit components. In other embodiments the RTC 231 may provide date and time information periodically, such as, for example, every ten milliseconds.

Processor 218 executes various computer programs that interact with operational modes of electronic and mechanical systems within the vehicle 210. Processor 218 controls communication (e.g. call signals) between telematics unit 216, wireless carrier system 232, and call center 238.

Processor 218 generates and accepts digital signals transmitted between telematics unit 216 and a vehicle communication network 212 that is connected to various electronic modules in the vehicle. In one mode, these digital signals activate the programming mode and operation modes within the electronic modules, as well as provide for data transfer between the electronic modules. In another mode, certain signals from processor 218 are translated into voice messages and sent out though speaker 228.

Associated with processor 218 is software 250 for monitoring and recording the incoming caller utterances.

Communications network 234 includes services from one or more mobile telephone switching offices and wireless networks. Communication network 234 connects wireless carrier system 232 to land network 236. Communications network 234 is implemented as any suitable system or collection of systems for connecting wireless carrier system 232 to vehicle 210 and land network 236.

Land network 236 connects to communications network 234 to call center 238. In one embodiment, land network 236 is a public switched telephone network (PSTN). In another embodiment, land network 236 is implemented as an Internet Protocol (IP) network. In other embodiments, land network 236 is implemented as a wired network, an optical network, a fiber network, other wireless network, or any combination thereof. Land network 236 is connected to one or more landline telephones. Communication network 234 and land network 236 connect wireless carrier system 232 to call center 238.

Call center 238 contains one or more voice data switches 240, one or more communication services managers 242, one or more communication services databases 244 containing subscriber profile records, subscriber behavioral pattern, and subscriber information, one or more communication services advisors 248, and one or more network systems 248.

Switch 240 of call center 238 connects to land network 236. Switch 240 transmits voice or data transmissions from call center 236, and receives voice or data transmissions from telematics unit 238 in vehicle 210 through wireless carrier system 232, communications network 234, and land network 236. Switch 240 receives data transmissions from or sends data transmissions to one or more communication service managers 242 via one or more network systems 248. Subscriber preferences or settings are transmitted to the vehicle during a data call and stored within memory in the vehicle telematics unit 216. The data calls are scheduled in response to an update of a subscriber profile record.

Call center 238 contains one or more service advisors 246. In one embodiment, service advisor 246 may be human. In another embodiment, service advisor 246 may be an automaton.

Referring to data structure 300, when a voice call is received at an IVR, a caller may be identified 302 by, for example, a PIN (Personal Identification Number), VIN (Vehicle Identification Number), or other identification means. In one embodiment, the caller identification data is transformed and generated into a key that indexes into a database containing stored caller information. The caller identification information may be stored at a call center 238 within a subscriber information database 244 or in a subscriber information database hosted at a third party facility (not shown).

In one embodiment, a hashing algorithm is used for key generation. In another embodiment, a combination of bit fields comprised of a caller PIN and VIN are used for key generation. Database key generation is well known in the art.

The caller identifier key 302 indexes 320 into a service Package 1 304 of which the caller subscribes. The service packages contain specific services such as Service 1 306, which may, for example, be comprised of basic safety and security services. Service 2 308, includes navigation routing services, and Service n 310 comprising concierge services. Alternatively the caller may subscribe to service Package 2 312 that contains Service 1 314, Service 2 316 through Service n 318 that may contain a subset or superset of the services offered in Package 1 304. For example, Package 2 312 Service 1 314 may provide concierge services that allow the subscriber to make hotel or restaurant reservations via telematics unit (FIG. 2, 216). In this embodiment the generated key will index 322 into Package 2 312. Package m may contain other services, such as, for example financial transaction services.

Figure 4:
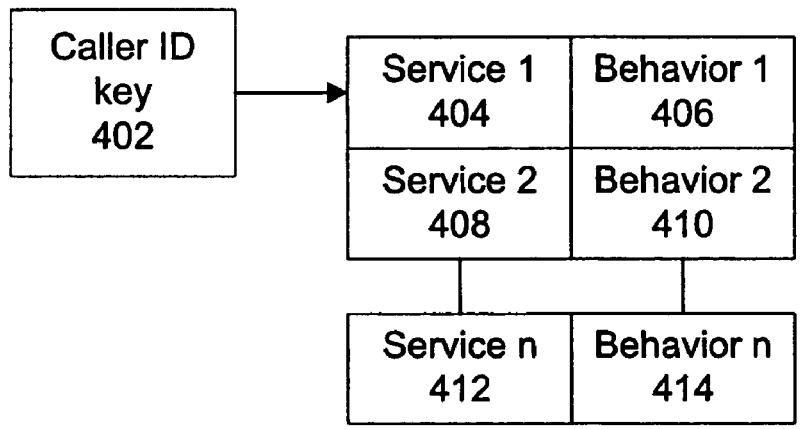
FIG. 4 is an example caller behavioral pattern data structure.

Referring now also to FIG. 4, a call is identified at block 302 (FIG. 3) and the generated key associated with the caller 402 indexes into a database containing stored caller behavior. In one embodiment the key indexes into the first service, Service 1 404 in the caller's subscription package. For example, Service 1 404 may be a safety and security service. Associated with Service 1 404 is Behavior 1 406, which is comprised of the aggregate subscriber behavior for Service 1 404 or an individual subscriber's behavior.

Other services included in the caller's subscription package may include Service 2 408 with Behavior 2 410 through Service n 412 through Behavior n 414. For example, Service 2 408 may be a subscription renewal service requested by callers. The associated Behavior 410 may include, for example, the average time subscribers call to renew their subscriptions from the time a subscription renewal notification is issued.

Parameters associated with Behaviors 406, 410 through 414 may be time sensitive, such as, for example the average time between the issuance of a notice and caller response time. In another example, the parameters associated with Behaviors 406, 410 through 414 may be location sensitive, such as, for example, navigation routing request characteristics based on callers driving in a common, complex urban location. The individual data structures representing caller behavior patterns are utilized as components or records in an aggregate call behavior pattern data structure.

Figure 5:
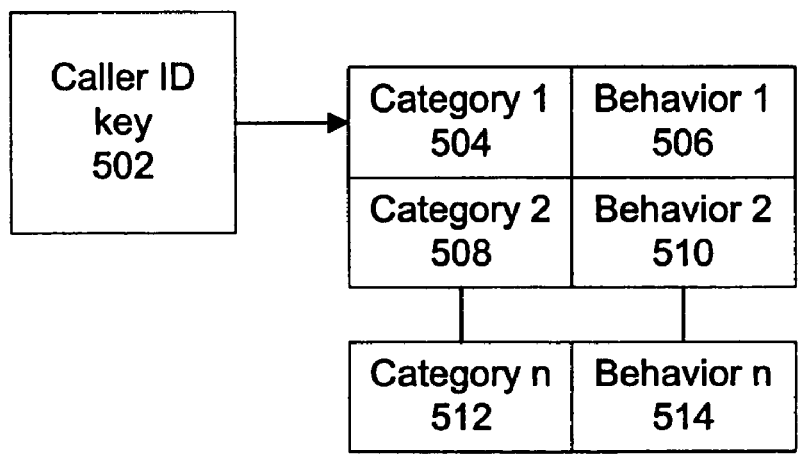
FIG. 5 is an example data structure associating caller behaviors with stored categories.

Referring now also to FIG. 5 and the data structure for predictive interactive voice recognition 500, a call is identified at block 302 (FIG. 3). The generated key associated with the caller 502 indexes into a database containing stored caller categories 504, 508, 512 and stored caller behaviors 506, 510, and 514. Category 1 504 includes data representing and identifying subscribers that have been sent renewal notifications. The associated behavior, Behavior 1 506, includes data representing the average time a subscriber responds to the said renewal notice.

Category 2 508 includes a list of subscribers that are within the first thirty days of a vehicle purchase. The associated behavior, Behavior 2 510, includes the average time a subscriber initiates a first or particular service request within the said thirty-day period. Categories through Category n 512 and associated Behavior n 514 are limited only by the capacity of the entity that hosts the data structure and the design choices of the system designer.

Figure 6:
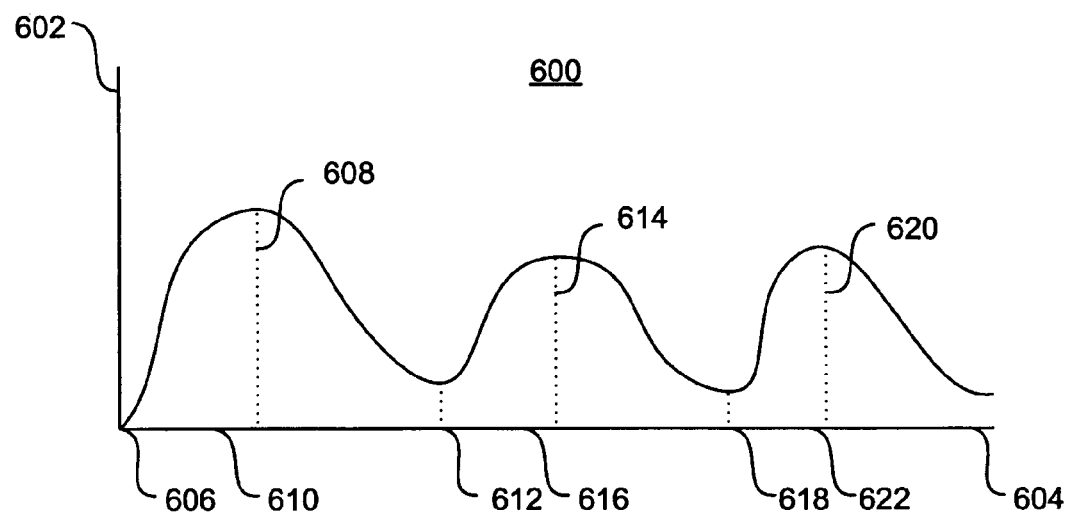
FIG. 6 is an example graph of a behavioral pattern.

Referring now to FIG. 6, in graph behavioral pattern 600, the Y axis 602 represents a probability value with respect to time P(t) and the X axis 604 represents time t. Event 606 represents, for example, a subscription renewal notice for a service delivered to an IVR system caller. In this example, the subscription renewal notice may be for vehicle telematics services such as navigation assistance or emergency assistance.

Reference 608 represents peak responses from recipients of 606. Reference 610 represents the time displacement from the issuance of the event 606 to the peak responses 608. For example, reference 610 represents the time displacement from the issuance of, for example, a subscription renewal notice to the peak response from subscribers.

Reference 612 represents another event, such as, for example a second issuance of a subscription renewal notice, with 614 representing the peak caller response to the second subscription renewal notice 612. Reference 616 represents the time displacement from the issuance of the second subscription renewal notice 612 to the peak caller response 614.

Reference 618 represents yet another event, such as, for example a third issuance of a subscription renewal notice, with 620 representing the peak caller response to the third subscription renewal notice 618. Reference 622 represents the time displacement from the issuance of the third subscription renewal notice 618 to the peak caller response 620.

Time intervals for the peak caller responses 608, 614, 620, comprise an aggregate caller behavioral pattern. This aggregate may be determined by finding the average of the peak caller responses 608, 614, and 620 and calculating the variance with respect to time of the peak caller responses 608, 614, and 620 and the issuance of the events 606, 612, and 618.

In this example, if a caller initiates a call to an IVR within a determined time interval, based on the aggregated caller behavior pattern, the call is assigned a confidence factor representing a belief that the call is a subscription renewal call and a subscription renewal service context is invoked.

The invention claimed is:

1. A method for a predictive interactive voice recognition system comprising the steps of:
   receiving a voice call;
   receiving an utterance from a caller;
   determining one or more words from the caller's utterance by performing speech recognition on the utterance;
   accessing a behavioral pattern associated with the caller that indicates the caller's past behavior based on multiple previous calls from the caller;
   determining a desired service context based on a combination of the one or more determined words and the behavioral pattern, wherein the desired service context is determined using at least one confidence factor related to the one or more determined words, the behavioral pattern or both; and
   invoking the desired service context.

2. The method of claim 1, wherein the step of determining one or more words further comprises the steps of determining in response to the utterance a caller utterance confidence factor representative of a degree of certainty that the caller utterance matches a word indicative of a service context.

3. The method of claim 2, wherein the accessing step further comprises accessing a behavior pattern confidence factor.

4. The method of claim 3, wherein the step of determining a desired service context further comprises forming a composite confidence factor from the caller utterance confidence factor and the behavior pattern confidence factor, and then using the composite confidence factor to determine the desired service context.

5. The method of claim 1, further comprising the steps of:
   recording caller service requests;
   creating a plurality of data records responsive to the caller service requests;
   categorizing the caller service requests based on a plurality of service contexts; and
   determining the behavioral pattern based on one or more of the categorizations.

6. The method of claim 1, further comprising the steps of:
   identifying a plurality of parameters related to the caller and the received voice call; and
   determining the behavioral pattern based on the parameters.

7. The method of claim 6, further comprising the step of retrieving stored caller information, wherein the step of determining the behavioral pattern is based at least in part on the stored caller information.

* * * * *